(12) United States Patent
Ramachandran et al.

(10) Patent No.: US 9,026,966 B1
(45) Date of Patent: May 5, 2015

(54) CO-SIMULATION METHODOLOGY TO ADDRESS PERFORMANCE AND RUNTIME CHALLENGES OF GATE LEVEL SIMULATIONS WITH, SDF TIMING USING EMULATORS

(71) Applicants: Naresh Ramachandran, Bangalore (IN); G. B. Ashok, Bangalore (IN); Ping-Sheng Tseng, Saratoga, CA (US)

(72) Inventors: Naresh Ramachandran, Bangalore (IN); G. B. Ashok, Bangalore (IN); Ping-Sheng Tseng, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/210,220

(22) Filed: Mar. 13, 2014

(51) Int. Cl.
 *G06F 9/455* (2006.01)
 *G06F 17/50* (2006.01)

(52) U.S. Cl.
 CPC .................................. *G06F 17/5081* (2013.01)

(58) Field of Classification Search
 CPC ............ G06F 17/5022; G06F 17/5045; G06F 2217/04
 USPC ........................... 716/106, 108, 111, 113, 134
 See application file for complete search history.

(56) References Cited

U.S. PATENT DOCUMENTS

| 5,812,414 | A | 9/1998 | Butts et al. | |
|---|---|---|---|---|
| 5,841,967 | A | 11/1998 | Sample et al. | |
| 6,002,861 | A | 12/1999 | Butts et al. | |
| 6,009,256 | A | 12/1999 | Tseng et al. | |
| 6,026,230 | A | 2/2000 | Lin et al. | |
| 6,058,492 | A | 5/2000 | Sample et al. | |
| 6,134,516 | A | 10/2000 | Wang et al. | |
| 6,321,366 | B1 | 11/2001 | Tseng et al. | |
| 6,389,379 | B1 | 5/2002 | Lin et al. | |
| 6,651,225 | B1 | 11/2003 | Lin et al. | |
| 6,785,873 | B1 | 8/2004 | Tseng et al. | |
| 6,810,442 | B1 | 10/2004 | Lin et al. | |
| 7,356,455 | B2 | 4/2008 | Quayle et al. | |
| 7,480,606 | B2 * | 1/2009 | Tseng et al. | ..................... 703/14 |
| 7,505,891 | B2 | 3/2009 | Lin et al. | |
| 7,512,728 | B2 | 3/2009 | Tseng et al. | |
| 7,792,933 | B2 | 9/2010 | Butts et al. | |
| 7,904,288 | B1 * | 3/2011 | Beausoleil et al. | ............. 703/23 |
| 8,244,512 | B1 | 8/2012 | Tseng et al. | |
| 8,250,545 | B2 * | 8/2012 | Satoh et al. | ................... 717/134 |
| 2002/0046391 | A1 * | 4/2002 | Ito et al. | .......................... 716/18 |
| 2009/0204931 | A1 * | 8/2009 | Lim et al. | .......................... 716/5 |

* cited by examiner

*Primary Examiner* — Brian Ngo
(74) *Attorney, Agent, or Firm* — Dickstein Shapiro LLP

(57) ABSTRACT

The present patent document relates to a method and apparatus for more efficiently simulating a circuit design (DUT), making use of a hardware functional verification device such as a processor-based emulator. A set of linked databases are compiled for the DUT, one for hardware emulation (without timing information for the DUT) and one for software simulation (including timing information) that remain synchronized during runtime. The compiled design is run in a hardware emulator during an initialization/configuration phase and the state saved. The state is then swapped to a software simulator where timing information, such as SDF timing, may be honored during the second part of the run and the user's test bench stimuli applied to the design.

16 Claims, 4 Drawing Sheets

CO-SIMULATION METHODOLOGY TO ADDRESS PERFORMANCE AND RUNTIME CHALLENGES OF GATE LEVEL SIMULATIONS WITH, SDF TIMING USING EMULATORS

FIELD

The present patent document relates generally to verifying the functionality of integrated circuit designs prior to fabrication. In particular, the present patent document relates to a method and apparatus for verifying a circuit design under test according to a co-simulation methodology using timing information.

BACKGROUND

Integrated circuit designs, such as those for modern system-on-a-chip ("SOC") devices, continue to grow is size and complexity. Shrinking transistor sizes mean that more and more transistors can be included in a SOC, while a greater number of features or components can be packed on the SOC. Functional verification of such devices, which may be SOCs or any other type of integrated circuit fabricated on a single substrate or multiple interconnected substrates, is usually included as part of the circuit design flow to help ensure that the fabricated device functions as intended.

The increasing size and complexity of the circuit designs to be verified (devices under test, or "DUT") mean that the functional verification portion of the design cycle is increasing in length. The verification stage may in some case be the longest stage of the design cycle. For example, running a simulation on a host computer to verify a SOC, or even a sub-portion of the SOC, written in the register transfer language ("RTL") design abstraction may take anywhere from hours to days. Devices that perform simulation-acceleration (also known as co-simulation) in a verification flow (or methodology) leverage high-performance hardware emulators along with simulation to increase the speed of the verification stage.

After a gate-level or netlist of a SOC or other complex design has been created, the simulation times may become much longer and challenging to verify, especially once timing information is included. This timing data may be in Standard Delay Format ("SDF"), which currently is an IEEE standard for the representation and interpretation of timing data that may be applied in a design flow. SDF may contain sections for both delays in interconnect and cell delays. SDF may also be used to back annotate as well as forward annotate a netlist. In a netlist simulation, including those using SDF annotation, just the initialization/configuration phase for some SOCs or chips may be extremely time consuming, taking anywhere between hours and days, which is all before the actual circuit testing commences. The significant length of time and resources that may be used to proceed through this initialization/configuration phase with different configuration scenarios for each test presents a challenge for engineers who have time and resource constraints.

Current approaches to deal with the long initialization and configuration times generally perform one of two workarounds. The first is to only partially initialize and configure the SOC. However, this results in missing complete configuration of the SOC during gate-level netlist simulation with timing. The described embodiments provide a complete configuration. The second is to provide for back door access using functional verification simulators. However, by circumventing the interface with back door access there is no validation of the interface, which is not desirable.

SUMMARY

A method and apparatus for verifying a circuit design under test according to a co-simulation methodology using timing information is disclosed.

An embodiment is a method of verifying a circuit design under test (DUT). The method comprises generating a hardware model of the DUT that can be programmed into a hardware functional verification system, generating a software model of the DUT for that can be simulated using a software simulator programmed into a computer, wherein the software model includes timing information for the DUT, emulating a behavior of the DUT that has been programmed into the hardware model to generate a state data set comprising bit values stored in storage components internal to the hardware functional verification system, wherein the state data set represents a state of the DUT at a time, loading the state data set to the software simulator, and simulating a behavior of the DUT with the software model beginning from the state of the DUT at the time.

Another embodiment is a method of generating a database for functional verification of a circuit design under test (DUT). The method comprises generating a netlist library for a hardware functional verification system from a simulation library, wherein the simulation library contains circuit elements and timing data for the circuit elements, compiling a first compilation data set of the DUT for the hardware functional verification system based on the netlist library for the hardware functional verification system and a netlist for the DUT, and compiling a second compilation data set of the DUT for the software simulator based on the first compilation data set, the simulation library, and timing data associated with the DUT.

Another embodiment is a computer-readable non-transitory storage medium having stored thereon a plurality of instructions. The plurality of instructions when executed by a computer, cause the computer to perform generating a hardware model of the DUT that can be programmed into a hardware functional verification system, generating a software model of the DUT for that can be simulated using a software simulator programmed into a computer, wherein the software model includes timing information for the DUT, emulating a behavior of the DUT that has been programmed into the hardware model to generate a state data set comprising bit values stored in storage components internal to the hardware functional verification system, wherein the state data set represents a state of the DUT at a time, loading the state data set to the software simulator, and simulating a behavior of the DUT with the software model beginning from the state of the DUT at the time.

Another embodiment is a computer-readable non-transitory storage medium having stored thereon a plurality of instructions. The plurality of instructions when executed by a computer, cause the computer to perform generating a netlist library for a hardware functional verification system from a simulation library, wherein the simulation library contains circuit elements and timing data for the circuit elements, compiling a first compilation data set of the DUT for the hardware functional verification system based on the netlist library for the hardware functional verification system and a netlist for the DUT, and compiling a second compilation data set of the DUT for the software simulator based on the first compilation data set, the simulation library, and timing data associated with the DUT.

According to another embodiment the timing annotation data is formatted according to the Standard Delay Format (SDF) standard.

According to another embodiment the DUT is specified according to a register transfer language.

According to another embodiment generating a hardware model of the DUT for a hardware functional verification system comprises compiling the DUT for a processor-based emulation engine.

Another embodiment further comprises swapping the second state from the software simulator to the hardware functional verification system to continue emulation, wherein simulating a behavior of the DUT with the software model incorporating the timing information comprises simulating a behavior of the DUT with the software model incorporating the timing information to a second state, further comprising:

Another embodiment further comprises generating a database including the hardware model and the software model.

Another embodiment further comprises generating a netlist library for the hardware functional verification system from a simulation library with timing information.

Another embodiment further comprises providing a simulation library to the software simulator, wherein the simulation library comprises timing information.

Another embodiment further comprises generating a database including the first compilation data set and the second compilation data set.

Another embodiment further comprises generating a first database including the first compilation data set for execution by the hardware functional verification system, and generating a second database including the second compilation data set for execution by the software simulator.

The above and other preferred features described herein, including various novel details of implementation and combination of elements, will now be more particularly described with reference to the accompanying drawings and pointed out in the claims. It will be understood that the particular methods and apparatuses are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate the presently preferred embodiments and together with the general description given above and the detailed description of the preferred embodiments given below serve to explain and teach the principles described herein.

Figure 1:
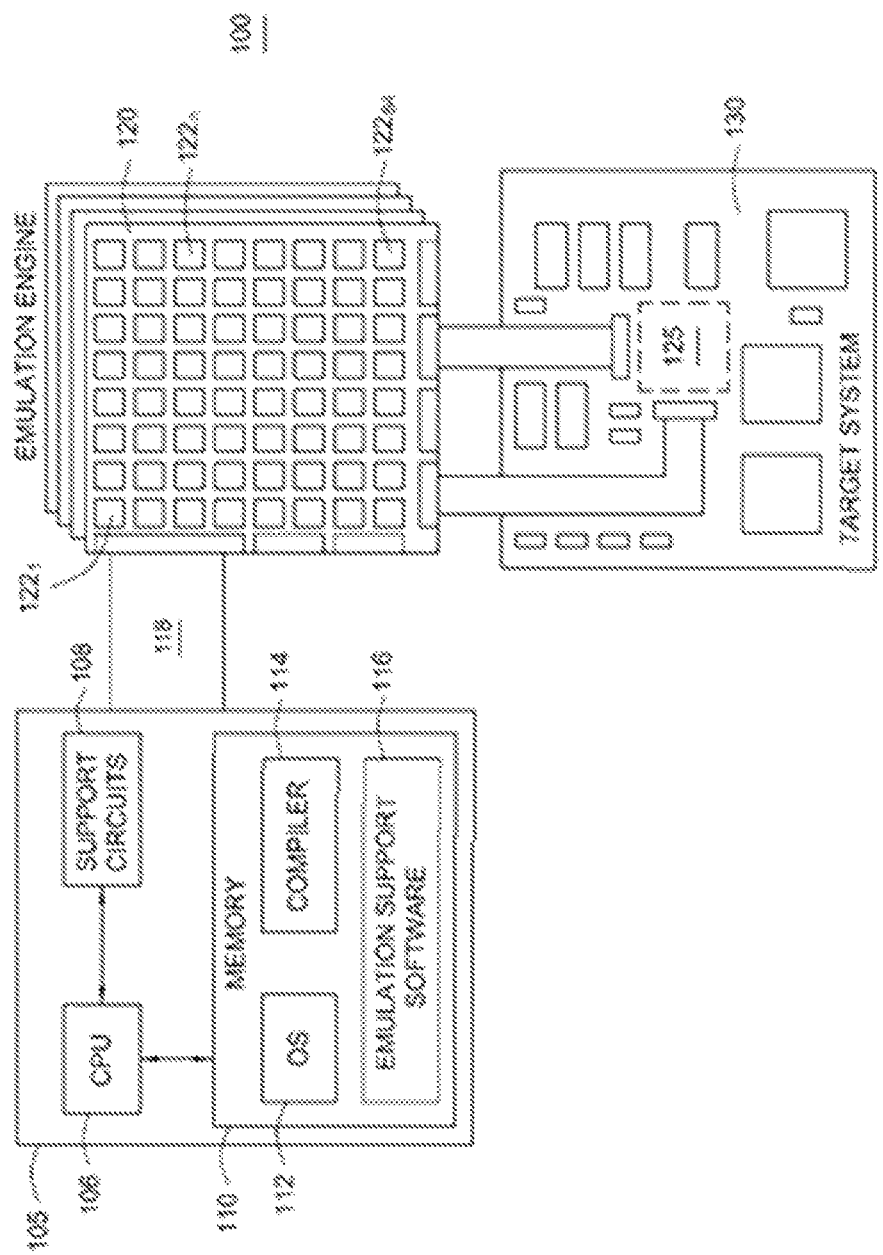
FIG. 1 is an illustration of a processor-based hardware emulation system.

The figures are not necessarily drawn to scale and the elements of similar structures or functions are generally represented by like reference numerals for illustrative purposes throughout the figures. The figures are only intended to facilitate the description of the various embodiments described herein; the figures do not describe every aspect of the teachings disclosed herein and do not limit the scope of the claims.

DETAILED DESCRIPTION

A method and apparatus for verifying a circuit design under test according to a co-simulation methodology using timing information is disclosed. Each of the features and teachings disclosed herein can be utilized separately or in conjunction with other features and teachings. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the various embodiments described herein. However, it will be apparent to one skilled in the art that these specific details are not required to practice the concepts described herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Also disclosed is an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), erasable programmable read-only memories (EPROMs), electrically erasable programmable read-only memories (EEPROMs), magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the present teachings.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Typical functional verification systems, including hardware emulation systems and simulation acceleration systems, utilize interconnected programmable logic chips or interconnected processor chips. Examples of systems using programmable logic devices are disclosed in, for example, U.S. Pat. No. 6,009,256 entitled "Simulation/Emulation System and Method," No. 5,109,353 entitled "Apparatus for emulation of electronic hardware system," No. 5,036,473 entitled "Method of using electronically reconfigurable logic circuits," No. 5,475,830 entitled "Structure and method for providing a reconfigurable emulation circuit without hold time violations," and No. 5,960,191 entitled "Emulation system with time-multiplexed interconnect." U.S. Pat. Nos. 6,009,256, 5,109,353, 5,036,473, 5,475,830, and 5,960,191 are incorporated herein by reference. Examples of hardware logic emulation systems using processor chips are disclosed in, for example, U.S. Pat. No. 6,618,698 "Clustered processors in an emulation engine," No. 5,551,013 entitled "Multiprocessor for hardware emulation," No. 6,035,117 entitled "Tightly coupled emulation processors," and No. 6,051,030 entitled "Emulation module having planar array organization." U.S. Pat. Nos. 6,618,698, 5,551,013, 6,035,117, and 6,051,030 which are incorporated herein by reference.

FIG. 1 illustrate an overview of a processor-based emulation system 100 according to an embodiment. The system comprises a host or computer workstation 105, an emulation engine including emulation board 120, and a target system 130. Here a processor-based emulation engine is described, though other emulation engines, such as those utilizing arrays of programmable logic devices (such as FPGAs) may also be used, for example properly-configured versions of the systems discussed above.

The host workstation 105 provides emulation support facilities to the emulation engine 100 and emulation board 120. The host workstation 105, for example a personal computer, comprises at least one central processing unit (CPU) 106, support circuits 108, and a memory 110. The CPU 106 may comprise one or more conventionally available microprocessors and/or microcontrollers. The support circuits 108 are well known circuits that are used to support the operation of the CPU 106. These supporting circuits comprise power supplies, clocks, input/output interface circuitry, cache, and other similar circuits.

Memory 110, sometimes referred to as main memory, may comprise random access memory, read only memory, disk memory, flash memory, optical storage, and/or various combinations of these types of memory. Memory 110 may in part be used as cache memory or buffer memory. Memory 110 stores various forms of software and files for the emulation system, such as an operating system (OS) 112, a compiler 114, and emulation support software 116.

The compiler 114 converts a hardware design, such as hardware described in VHDL or Verilog, to a sequence of instructions that can be evaluated by the emulation board 120.

The host workstation 105 allows a user to interface with the emulation engine 100 via communications channel 118, including emulation board 120, and control the emulation process and collect emulation results for analysis. Under control of the host workstation 105, programming information and data is loaded to the emulation engine 100. The emulation board 120 has on it a number of individual emulation chips, for example the 64 emulation chips $122_1$ to $122_{64}$ (collectively 122) shown in FIG. 1, in addition to miscellaneous support circuitry.

In response to programming received from the emulation support software 116, emulation engine 100 emulates a portion 125 of the target system 130. Portion 125 of the target system 130 may be an integrated circuit, a memory, a processor, or any other object or device that may be emulated in a programming language. Exemplary emulation programming languages include Verilog and VHDL.

Figure 2:
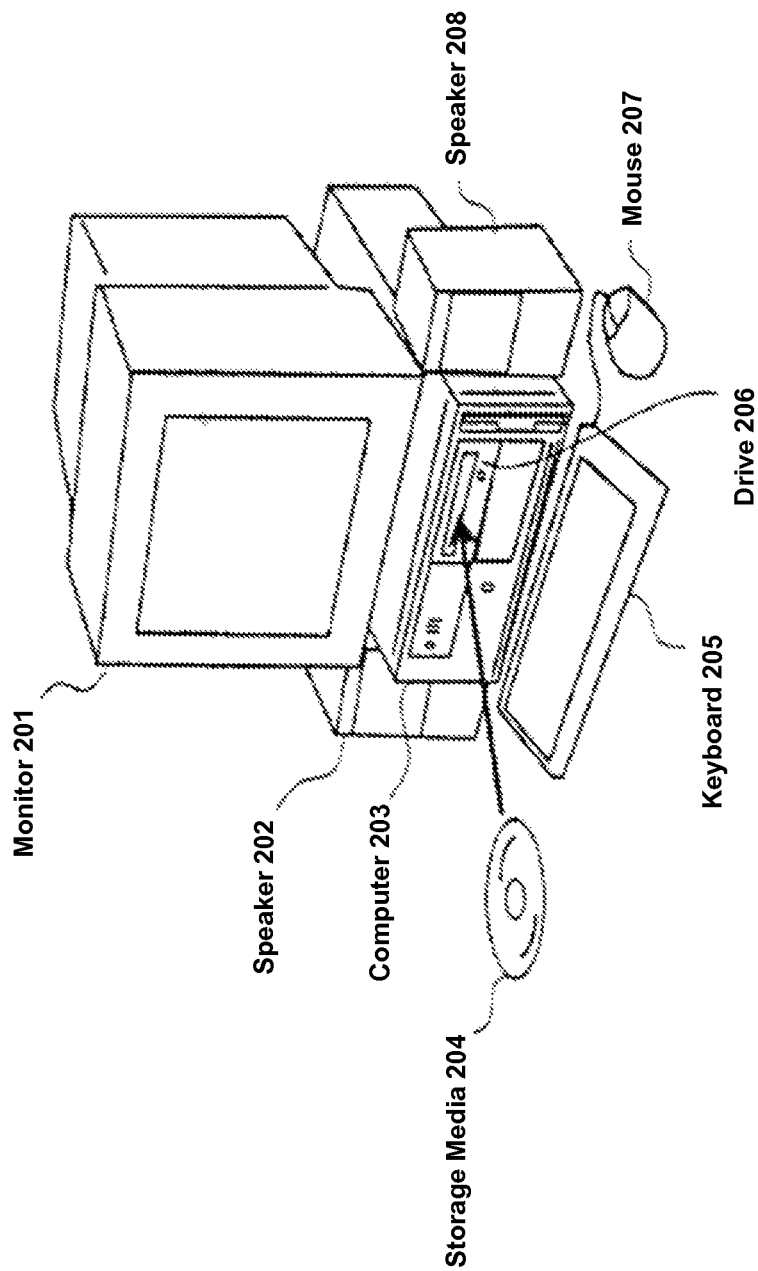
FIG. 2 is an illustration of an exemplary general-purpose computer system.

FIG. 2 illustrates an exemplary general-purpose computer system to provide simulation resources, according to an embodiment. The computer system comprises a computer 203 configured to read storage media 204 at its drive 206. The computer system further includes a monitor 201 for the user to view visual output from the computer 203, and keyboard 205 and mouse 207 for the user to input data and commands to computer 203. Storage media 204, although illustrated as an optical disk for an optical drive 206 for ease of understanding in this illustration, may be any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions. The storage media or medium may be internal to the computer 203, or external and attachable through a communication interface. Drive 206 may be any drive suitable for reading storage media 204 or any interface suitable to couple storage media 204 to the bus of computer 203 when storage media 204 is read. The exemplary computer system can be programmed by a user according to the various disclosed embodiments to perform these methods. The computer system may be programmed by reading instructions stored in internal or external computer storage media 204.

Though separately illustrated in FIGS. 1 and 2 herein, host workstation 105 of FIG. 1 may also run simulation software in addition to the emulation support software. The computers may be either the same or different for emulation and simulation according to the current disclosure.

Figure 3:
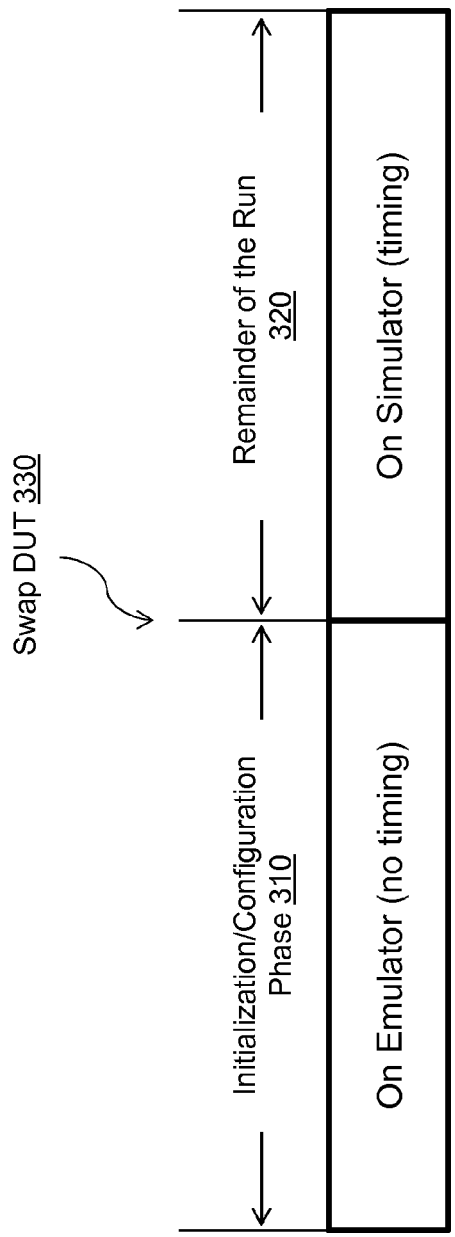
FIG. 3 illustrates a netlist simulation acceleration runtime.

FIG. 3 depicts a netlist simulation acceleration runtime according to an embodiment. The initialization/configuration phase 310 occurs first in time, followed by the remainder of the run 320 that incorporates timing information. The initialization phase 310 may be the most time consuming phase from some user circuit designs or SOCs. Hardware functional verification devices (which may also be called an "emulator" in this disclosure), do not take into account timing information, but frequently are much faster than a software simulator. The gate-level or netlist simulations can be run with high performance on hardware. Therefore an emulator is used during the initialization and configuration phase, without timing information. Then, during the subsequent remainder of the run 320, the design undergoing verification is swapped out of the emulator (at time point 330) to run on the software simulator, honoring the timing simulation.

This approach helps in doing the SOCs netlist configuration much faster. The approach leverages hot-swap features of certain simulation-acceleration (emulation) devices. Here hot-swap means that during the runtime the design can be swapped into an emulator for high performance and swapped-out of the emulator and run in software simulator for debugging.

An exemplary system to provide such hot-swap functionality is described by U.S. Pat. No. 6,009,256 entitled "Simulation/Emulation System and Method," which is incorporated herein by reference. That exemplary system uses a plurality of programmable logic devices for hardware emulation and a software simulator, but a system using a plurality of processor chips may also be used for hardware emulation according to the current embodiments.

Figure 4:
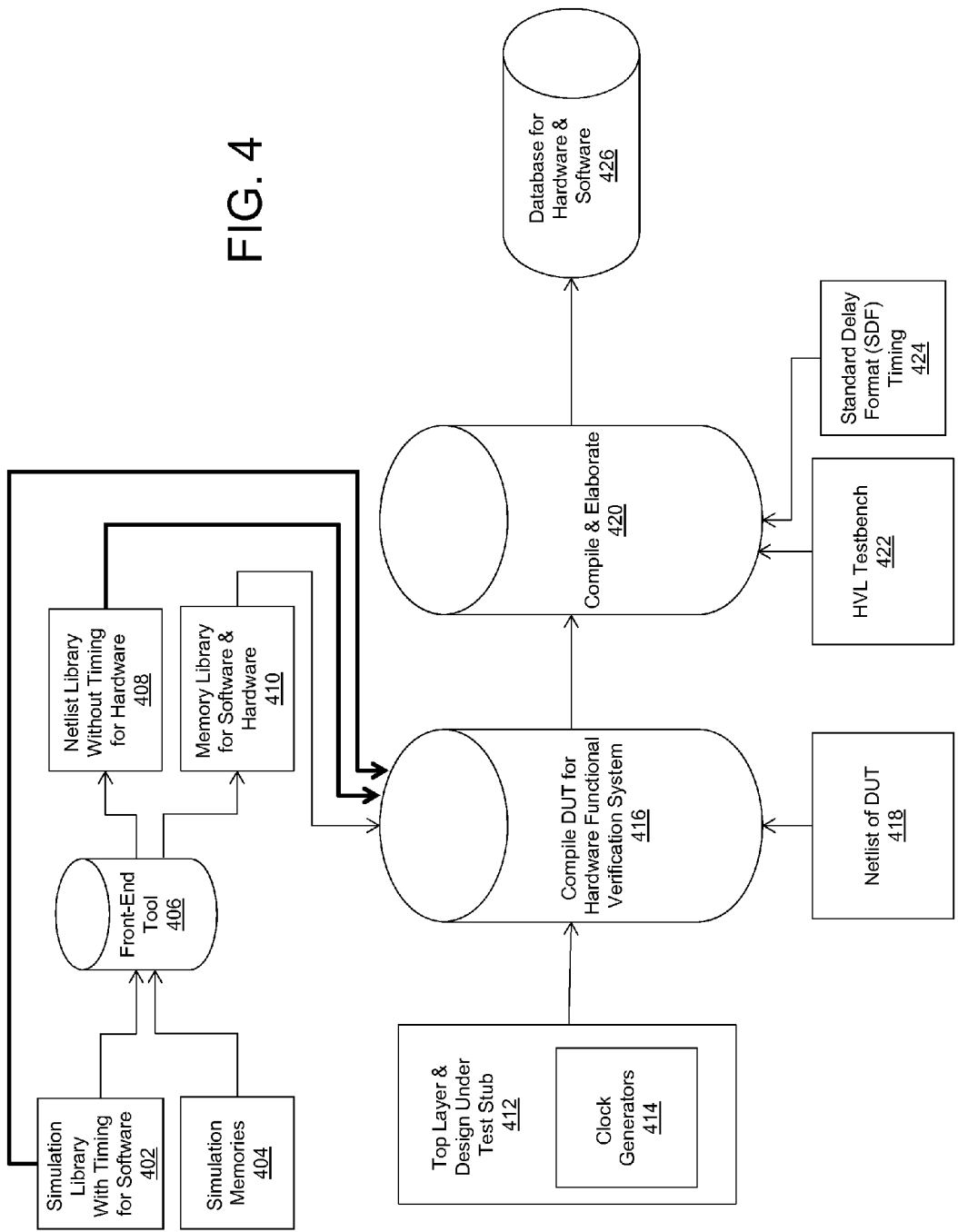
FIG. 4 illustrates a netlist simulation acceleration flow.

For many circuit designs, the timing annotations do not impact the initialization/configuration phase. That is, from the perspective of functional verification, the initialization/configuration phase may be performed more quickly by using a hardware emulator—which is a non-timing functional verification tool—while setting aside the timing annotations during this phase. Here, the term emulator is used as a short-hand for a hardware functional verification system, including both processor-based and programmable logic device-based systems. FIG. 4 illustrates a netlist simulation acceleration flow according to an embodiment. In this flow, timing annotations (which may be presented in SDF or some other format) are not used in the initialization/configuration phase of the flow, but the timing annotations are honored when in the flow is using the software simulator.

Simulation library 402 is first provided. Among the other technology data and library cell primitives and associated data typically provided in the library, simulation library 402 includes timing or delay information for use in the simulator. Also provided are the simulation libraries 404 for memories for use during simulation. Memory components are block storage components with address and control lines to access individual data in specific memory locations. Examples include ROM, asynchronous RAM, and synchronous RAM. Here, the memories 404 are described separately from the rest of the simulation library 402.

The simulation library 402 and memories 404 are provided to a synthesis tool 406 at the front end of the simulation accelerator to generate libraries for use in an emulator. The first result is a netlist library 408 for emulation. Emulators verify the logic of a DUT, but not timing. As a result, the emulator netlist library 408 lacks timing information. The second result is the memory library 410 that will be used by both the hardware, e.g. the emulator, and the software simulator of a simulation acceleration system.

The hardware functional verification system (emulator) 416 takes several inputs for use when compiling the DUT. A netlist 418 for the logic of the design under test ("DUT") to be emulated is provided to the emulator. For purposes of this disclosure, the exact type of DUT, and therefore its netlist, does not matter for the described flow. The DUT may be an SOC or another circuit design. Also provided to the emulator 416 is a top design layer having the DUT wrapper and other components to assist in the test of the DUT, as well as a test stub 412 for the DUT and clock generators 414. The test stubs are provided to simulate the behavior of the various software components or modules that the DUT depends on. The compiler of emulator 416 uses the netlist library 408 without timing information and the memory library 410 for hardware to compile the DUT for emulator 416; simulation library 402 is not used as part of the compiled DUT, but is set aside for later use.

After compilation by the hardware functional verification system, the simulator then compiles the testbench and elaborates the testbench and DUT at compile step 420. The simulation software now uses the simulation library 402, which has timing information, the memory library for software 410, testbench 422, and timing information 424. Compile 420 links the simulation library 402, including the timing information, to the DUT compiled at 416.

The testbench 422 for example may be a particular user's hardware verification language ("HVL") testbench. Testbench components are software processes used to control and monitor the simulation processes. These components are not part of the hardware circuit DUT. Test-bench components control the simulation by generating clock signals, initializing simulation data, and reading simulation test vector patterns from disk/memory. Test-bench components also monitor the simulation by checking for changes in value, performing value change dump, checking asserted constraints on signal value relations, writing output test vectors to disk/memory, and interfacing with various waveform viewers and debuggers. The timing information 424 may be according to the Standard Delay Format (SDF), but other timing formats may be used according to other embodiments. Such timing information can provide information about the delays in interconnect and cell delays of the DUT. The simulation library 402 is further described above, but generally contains describes the functionality of the component in the library corresponding to an instance of that component in the DUT to ensure proper simulation. The memory library for software 410 contains information relating to the memories for use during simulation.

The result of the compilation at 416 in the hardware functional verification system and compilation and elaboration 420 is a pair of databases 426, one each for software and hardware. The first database is used by the hardware functional verification system during logic verification, and does not including timing information. The second database is used by the simulation software, and includes information for verifying timing for the DUT. The two databases may also be joined in a single database, or further split into multiple databases. These databases are linked and synchronized so that during runtime the state of the DUT may be swapped from the simulator to the emulator, or from the emulator to the simulator. The linked database 426 is used during runtime, but not generally modified.

During runtime, once the configuration/initialization phase is complete in the emulator, the state of the DUT is swapped out of the emulator and into the simulator when the initialization/configuration phase ends and the remainder of the run starts as shown at time point 330 in FIG. 3. The rest of the test is run in the software simulator honoring the timing simulation, e.g. in SDF format. Swapping may occur by using hot-swap functionality that allows a user to stop software simulation, hardware emulation, or simulation acceleration at a given time, on a cycle-by-cycle basis, to inspect and store values from various storage components of the modeled DUT, such as registers, without the need for re-compilation. Register components are simple storage components. A state transition of a register is controlled by a clock signal. Examples include flip-flops (D-type, JK-type) and level-sensitive latches. The state of the DUT may be saved as a state data set (for example in a database) representing the values of the various storage components of the DUT and then moved from one simulation acceleration system, e.g. software simulation, to another, e.g. hardware functional verification system. Hot-swap provides for speed in the emulator, but allows the design to be swapped into the simulator for functions not enabled by emulator, such as debugging timing errors.

Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

We claim:

1. A method of verifying a circuit design under test (DUT), comprising:
   generating a hardware model of the DUT;
   generating a software model of the DUT, wherein the software model includes timing information for the DUT;
   programming the hardware model of the DUT into a hardware functional verification system;
   emulating a behavior of the DUT that has been programmed into the hardware model from a first time to a second time to generate a state data set comprising bit values stored in storage components internal to the hardware functional verification system, wherein the state data set represents a state of the DUT at the second time;
   loading the state data set to the software simulator; and
   simulating a behavior of the DUT with the software model in a simulator programmed into a computer beginning from the state of the DUT at the second time.

2. The method of claim 1, wherein the timing annotation data is formatted according to the Standard Delay Format (SDF) standard.

3. The method of claim 1, wherein the DUT is specified according to a register transfer language.

4. The method of claim 3, wherein generating a hardware model of the DUT for a hardware functional verification system comprises compiling the DUT for a processor-based emulation engine.

5. The method of claim 1, wherein simulating a behavior of the DUT with the software model incorporating the timing information comprises simulating a behavior of the DUT with the software model incorporating the timing information from the state of the DUT at the second time to a second state of the DUT at a third time, further comprising:
   swapping, at the third time, the second state from the software simulator to the hardware functional verification system to continue emulation starting from the third time.

6. The method of claim 1, further comprising generating a database including the hardware model and the software model.

7. The method of claim 1, further comprising generating a netlist library for the hardware functional verification system from a simulation library with timing information.

8. The method of claim 1, further comprising providing a simulation library to the software simulator, wherein the simulation library comprises timing information.

9. A computer-readable non-transitory storage medium having stored thereon a plurality of instructions, the plurality of instructions when executed by a computer, cause the computer to perform:
   generating a hardware model of the DUT;
   generating a software model of the DUT, wherein the software model includes timing information for the DUT;
   programming the hardware model of the DUT into a hardware functional verification system;
   emulating a behavior of the DUT that has been programmed into the hardware model from a first time to a second time to generate a state data set comprising bit values stored in storage components internal to the hardware functional verification system, wherein the state data set represents a state of the DUT at the second time;
   loading the state data set to the software simulator; and
   simulating a behavior of the DUT with the software model in a simulator programmed into a computer beginning from the state of the DUT at the second time.

10. The computer-readable non-transitory storage medium having stored thereon a plurality of instructions of claim 9, wherein the timing annotation data is formatted according to the Standard Delay Format (SDF) standard.

11. The computer-readable non-transitory storage medium having stored thereon a plurality of instructions of claim 9, wherein the DUT is specified according to a register transfer language.

12. The computer-readable non-transitory storage medium having stored thereon a plurality of instructions of claim 11, wherein generating a hardware model of the DUT for a hardware functional verification system comprises compiling the DUT for a processor-based emulation engine.

13. The computer-readable non-transitory storage medium having stored thereon a plurality of instructions of claim 9, wherein simulating a behavior of the DUT with the software model incorporating the timing information comprises simulating a behavior of the DUT with the software model incorporating the timing information from the state of the DUT at the second time to a second state of the DUT at a third time, and wherein the plurality of instructions when executed by a computer, cause the computer to further perform:
   swapping, at the third time, the second state from the software simulator to the hardware functional verification system to continue emulation starting from the third time.

14. The computer-readable non-transitory storage medium having stored thereon a plurality of instructions of claim 9, wherein the plurality of instructions when executed by a computer, cause the computer to further perform generating a database including the hardware model and the software model.

15. The computer-readable non-transitory storage medium having stored thereon a plurality of instructions of claim 9, wherein the plurality of instructions when executed by a computer, cause the computer to further perform generating a netlist library for the hardware functional verification system from a simulation library with timing information.

16. The computer-readable non-transitory storage medium having stored thereon a plurality of instructions of claim 9, wherein the plurality of instructions when executed by a computer, cause the computer to further perform providing a simulation library to the software simulator, wherein the simulation library comprises timing information.

* * * * *